(12) United States Patent
Moser et al.

(10) Patent No.: US 9,023,298 B2
(45) Date of Patent: May 5, 2015

(54) HIGH TEMPERATURE PLATFORMER

(75) Inventors: Mark D. Moser, Elk Grove Village, IL (US); Clayton C. Sadler, Arlington Heights, IL (US); Mark P. Lapinski, Aurora, IL (US); Kurt M. VandenBussche, Lake in the Hills, IL (US)

(73) Assignee: UOP LLC, Des Plaines, IL (US)

( * ) Notice: Subject to any disclaimer, the term of this patent is extended or adjusted under 35 U.S.C. 154(b) by 458 days.

(21) Appl. No.: 13/440,527

(22) Filed: Apr. 5, 2012

(65) Prior Publication Data

US 2012/0275974 A1    Nov. 1, 2012

Related U.S. Application Data

(60) Provisional application No. 61/480,672, filed on Apr. 29, 2011.

(51) Int. Cl.
| | | |
|---|---|---|
| *B01J 8/00* | (2006.01) | |
| *B01J 8/04* | (2006.01) | |
| *B01J 19/00* | (2006.01) | |
| *B01J 19/24* | (2006.01) | |

(Continued)

(52) U.S. Cl.
CPC .................. *C01B 3/26* (2013.01); *B01J 8/0492* (2013.01); *B01J 8/0496* (2013.01); *B01J 8/008* (2013.01); *B01J 8/0415* (2013.01); *B01J 2208/00194* (2013.01); *B01J 2208/0053* (2013.01); *B01J 2219/024* (2013.01); *C01B 2203/0277* (2013.01)

(58) Field of Classification Search
CPC .............. B01J 8/00; B01J 8/008; B01J 8/04; B01J 8/0403; B01J 8/0407; B01J 8/0415; B01J 8/0446; B01J 8/0492; B01J 8/0496; B01J 19/00; B01J 19/0006; B01J 19/0046; B01J 19/24; B01J 2208/00; B01J 2208/00008; B01J 2208/00017; B01J 2208/00106; B01J 2208/00168; B01J 2208/00194; B01J 2208/0053; B01J 2219/00; B01J 2219/02; B01J 2219/025; B01J 2219/0277; C01B 3/00; C01B 3/02; C01B 3/22; C01B 3/24; C01B 3/26; C01B 3/32; C01B 3/34; C01B 3/38; C01B 3/384; C01B 2202/00; C01B 2203/02; C01B 2203/0205; C01B 2203/0227; C01B 2203/0233; C01B 2203/0266; C01B 2203/0277; C01B 2203/0283
USPC .................. 422/129, 187, 198, 600, 625–631; 585/310, 314, 400, 412, 413, 500, 654, 585/659; 208/46, 49, 56, 62, 63, 133, 134, 208/142
See application file for complete search history.

(56) References Cited

U.S. PATENT DOCUMENTS 4,297,150 A * 10/1981 Foster et al. .................. 148/276
5,879,537 A *  3/1999 Peters .......................... 208/134

(Continued)

OTHER PUBLICATIONS

U.S. Appl. No. 13/416,513, filed Mar. 9, 2012, Serban.

(Continued)

*Primary Examiner* — Natasha Young

(57) ABSTRACT

An apparatus for reforming a hydrocarbon stream is presented. The apparatus involves changing the design of reformers and associated equipment to allow for increasing the processing temperatures in the reformers and heaters. The reformers are operated under different conditions to utilize advantages in the equilibriums, but require modifications to prevent increasing thermal cracking and to prevent increases in coking.

5 Claims, 2 Drawing Sheets

(51) Int. Cl.
*C01B 3/00* (2006.01)
*C01B 3/02* (2006.01)
*C01B 3/22* (2006.01)
*C01B 3/24* (2006.01)
*C01B 3/26* (2006.01)
*C01B 3/32* (2006.01)
*C01B 3/34* (2006.01)
*C01B 3/38* (2006.01)

(56) References Cited

U.S. PATENT DOCUMENTS 6,074,713 A * 6/2000 Trotter, Jr. .................... 428/34.4
2007/0178322 A1* 8/2007 Chun et al. .................... 428/469

OTHER PUBLICATIONS

U.S. Appl. No. 13/416,702, filed Mar. 9, 2012, Gajda.
U.S. Appl. No. 13/417,181, filed Mar. 9, 2012, Gajda.
U.S. Appl. No. 13/417,200, filed Mar. 9, 2012, Wegerer.
U.S. Appl. No. 13/417,202, filed Mar. 9, 2012, Gajda.
U.S. Appl. No. 13/417,203, filed Mar. 10, 2012, Gajda.
U.S. Appl. No. 13/440,487, filed Apr. 5, 2012, Moser.
U.S. Appl. No. 13/416,577, filed Mar. 9, 2012, Negiz.
U.S. Appl. No. 13/440,381, filed Apr. 5, 2012, Moser.
U.S. Appl. No. 13/428,005, filed Mar. 23, 2012, Serban.
U.S. Appl. No. 13/416,604, filed Mar. 9, 2012, Serban.
U.S. Appl. No. 13/327,164, filed Dec. 15, 2011, Moser.
U.S. Appl. No. 13/327,200, filed Dec. 15, 2011, Moser.
U.S. Appl. No. 13/327,143, filed Dec. 15, 2011, Moser.
U.S. Appl. No. 13/327,212, filed Dec. 15, 2011, Moser.
U.S. Appl. No. 13/327,220, filed Dec. 15, 2011, Moser.
U.S. Appl. No. 13/327,185, filed Dec. 15, 2011, Serban.
U.S. Appl. No. 13/327,178, filed Dec. 15, 2011, Serban.
U.S. Appl. No. 13/327,170, filed Dec. 15, 2011, Serban.
U.S. Appl. No. 13/327,192, filed Dec. 15, 2011, Serban.

* cited by examiner

US 9,023,298 B2

HIGH TEMPERATURE PLATFORMER

CROSS-REFERENCE TO RELATED APPLICATION

This application claims priority from U.S. Provisional Application No. 61/480,672, filed Apr. 29, 2011, the contents of which are hereby incorporated by reference in its entirety.

FIELD OF THE INVENTION

The present invention relates to the process of enhancing the production of aromatic compounds. In particular the improvement and enhancement of aromatic compounds such as benzene, toluene and xylenes from a naphtha feedstream through changing process conditions.

BACKGROUND OF THE INVENTION

The reforming of petroleum raw materials is an important process for producing useful products. One important process is the separation and upgrading of hydrocarbons for a motor fuel, such as producing a naphtha feedstream and upgrading the octane value of the naphtha in the production of gasoline. However, hydrocarbon feedstreams from a raw petroleum source include the production of useful chemical precursors for use in the production of plastics, detergents and other products.

The upgrading of gasoline is an important process, and improvements for the conversion of naphtha feedstreams to increase the octane number have been presented in U.S. Pat. Nos. 3,729,409, 3,753,891, 3,767,568, 4,839,024, 4,882,040 and 5,242,576. These processes involve a variety of means to enhance octane number, and particularly for enhancing the aromatic content of gasoline.

Processes include splitting feeds and operating several reformers using different catalysts, such as a monometallic catalyst or a non-acidic catalyst for lower boiling point hydrocarbons and bi-metallic catalysts for higher boiling point hydrocarbons. Other improvements include new catalysts, as presented in U.S. Pat. Nos. 4,677,094, 6,809,061 and 7,799,729. However, there are limits to the methods and catalysts presented in these patents, and which can entail significant increases in costs.

SUMMARY OF THE INVENTION

An apparatus for reforming a hydrocarbon process stream is presented. The apparatus comprises a vessel having a non-coking inner surface, with an inlet for the hydrocarbon process stream, and an outlet for an effluent stream. The vessel includes an inlet for a catalyst feedstream and an outlet for a catalyst effluent stream. The apparatus includes a heat exchanger having an inlet for admitting the hydrocarbon process stream and an outlet in fluid communication with the vessel hydrocarbon process stream inlet, with a conduit connecting the heat exchanger with the vessel inlet. The conduit has a coating on the internal surface that is made of a non-coking material.

A plurality of reactor beds are disposed within the reformer vessel. The reactor beds allow for flow of catalyst from one reactor bed to a subsequent reactor bed, with the last reactor bed having a catalyst outlet for passing the spent catalyst to a regenerator. The process stream is passed through interbed heaters as the process stream passes from one reactor bed to a subsequent reactor bed.

Other objects, advantages and applications of the present invention will become apparent to those skilled in the art from the following drawings and detailed description of the invention.

DETAILED DESCRIPTION OF THE INVENTION

Figure 1:
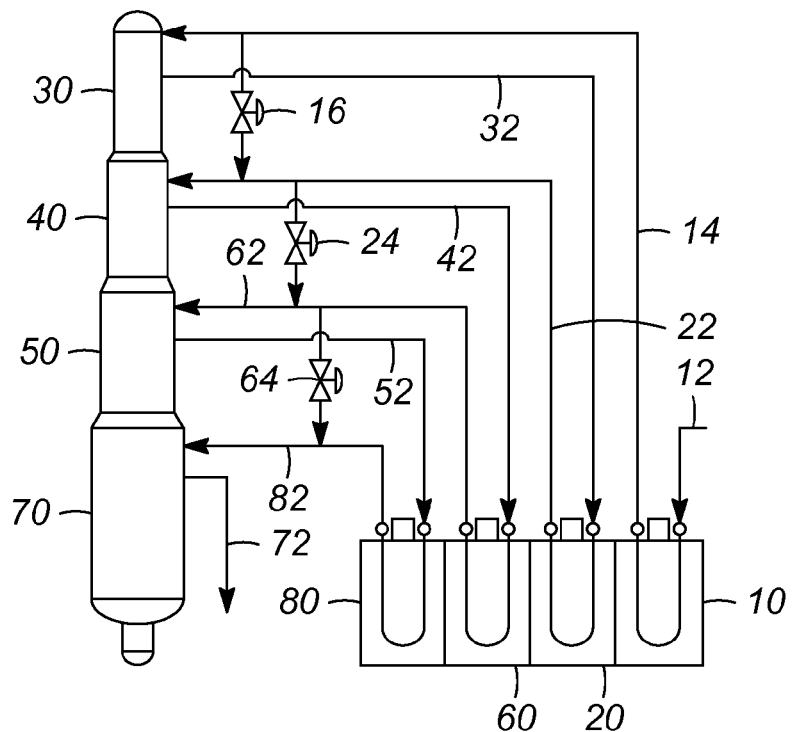
FIG. 1 shows a four reactor system with interbed heaters, including reactor/heater bypasses to shift duty from upstream heaters to downstream heaters.

Reforming of a hydrocarbon stream for the production of aromatics is an important process. In general, high operating temperatures are preferred for operating a reformer, as the equilibriums at the higher temperatures favors the formation of aromatic compounds. However, the reforming process is operated at a lower temperature due to the thermal cracking and the metal catalyzed coking that occurs as the temperature is increased. It has been found that using reactor vessels with non-metallic coatings allow for higher temperature operations, without the accompanying increase in coking or thermal cracking.

The present invention provides for increased aromatics yields by changing the normal operating parameters for the hydrocarbon reformation process. The reformation process is a process of converting paraffinic hydrocarbons to aromatic hydrocarbons through cyclization and dehydrogenation. The cyclization and dehydrogenation goes through many steps, and can generate olefins as well as naphthenes. In turn the olefins can be cyclized and dehydrogenated, and the naphthenes can be dehydrogenated.

Increasing the temperature would normally be a preferred condition, since the higher temperatures shift the equilibriums of the reforming reactions to favor the production of aromatics. However, increasing the temperatures increases the formation of coke on the catalyst, and more rapidly deactivates the catalyst. Increasing temperatures also increases thermal cracking for the heavier hydrocarbons, and can start or increase metal catalyzed coking on the surfaces of the reactor vessel or piping used to transport the hydrocarbons to the reformer. This in turn requires more energy to regenerate the catalyst on a more frequent basis. Currently, the reformation process has been optimized to run at lower temperatures to balance the production of aromatics against the costs in time and energy of regenerating the catalyst, as well as minimizing thermal cracking and metal catalyzed coking.

The present invention includes an apparatus for the reforming of a hydrocarbon process stream. The apparatus includes a vessel having a non-coking inner surface, with an inlet for the hydrocarbon process stream, an outlet for an effluent stream, a catalyst inlet for a catalyst stream and a catalyst outlet for the catalyst effluent stream. The apparatus include a heat exchanger having an inlet for admitting the hydrocarbon process stream and an outlet in fluid communication with the vessel hydrocarbon process stream inlet. The apparatus further includes a conduit connecting the heat exchanger outlet to the vessel process fluid inlet, wherein the conduit is coated with a non-coking material on the internal surface. The apparatus can comprise a plurality of reactor beds disposed within the vessel, and where each reactor bed includes a catalyst inlet and a catalyst outlet, and a process stream inlet and a process stream outlet. The apparatus can further include interbed heaters, wherein each heater is in fluid communication with a reactor bed process stream outlet, and an outlet in fluid communication with a reactor bed process stream inlet.

The reactor internals, and internal surfaces can be coated with a non-coking material. The non-coking materials can include non-metallic coatings, such as aluminas, silicas, ceramics, metal oxides, metal sulfides, glasses, refractory materials, and the like. The internal surface can also be reacted with a material to make the surface a non-coking surface, such as treating the surfaces to form a sulfide coating.

The apparatus can include a plurality of reactor beds, having a radial flow reactor design. The vessel includes a plurality of modified scallops arrayed circumferentially around the inside wall of the vessel. The scallops are chosen as modified scallops to limit the volume of catalyst in low flow zones. The radial design includes a central perforated pipe, and the reactor beds are disposed between the central pipe and the scallops arrayed around the interior of the vessel.

The apparatus includes auxiliary heaters for heating the process stream as the process stream flows from one reactor bed to the next reactor bed. The auxiliary heaters have an inlet in fluid communication with a reactor bed process stream outlet, and an outlet in fluid communication with a subsequent reactor bed process stream inlet. The reactor beds are sized to limit the temperature drops. Preferably, the temperature drop within an individual reactor bed is limited to 10° C. The auxiliary heaters are sized to heat the process stream to within 5 C of the inlet temperature of the first reactor bed.

Figure 3:
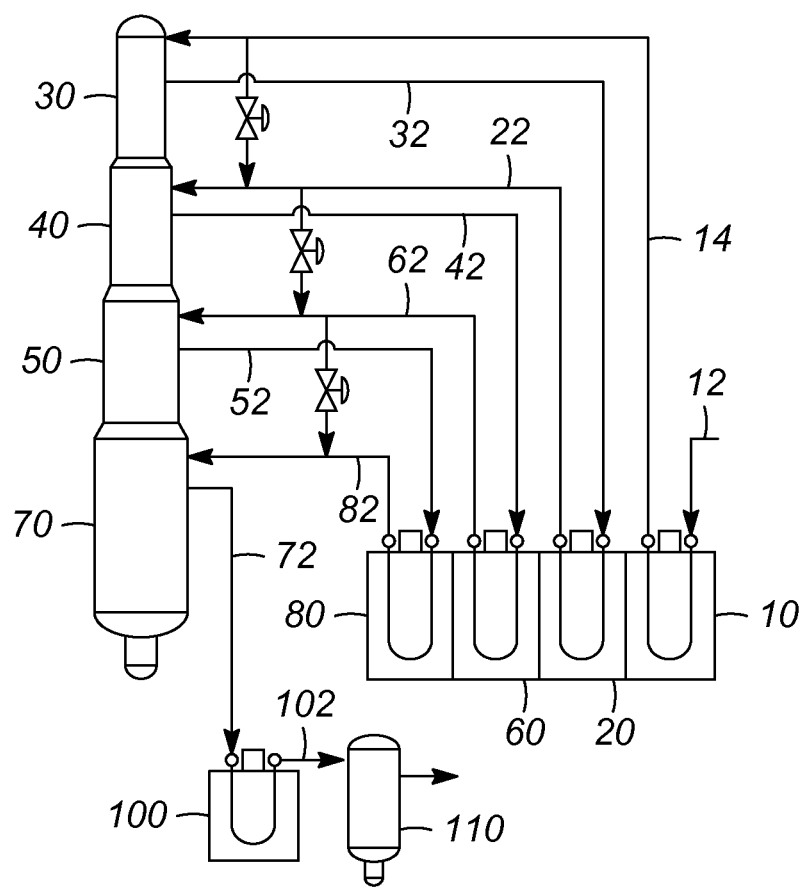
FIG. 3 shows a four reactor system with a tail heater and a tail reactor.

One embodiment of the invention includes adding a tail heater and a tail reactor. The apparatus comprises a 4 reactor system in the reformer, as shown in FIG. 3. The apparatus includes a charge heater that heats a preheated feedstream and passes the heated feedstream to the first reactor. The first reactor generates a process stream that is heated through a interbed heater to the second reactor inlet temperature. The process stream continues passing through a sequence of reactor beds and interbed heaters to generate an effluent stream. The effluent stream is passed to the tail heater and heated to a final inlet temperature for the tail reactor. The tail reactor can be operated at a greater temperature to provide for a final increase in the production of aromatics. The reactor designs are to provide relatively short contact times and high temperatures for the conversion process.

The present invention is a process and apparatus for generating aromatics from a hydrocarbon feedstream. The process includes passing the hydrocarbon feedstream to a reformer, wherein the reformer is operated at a temperature greater than 540 C, and the internal surfaces of the reactor are coated with a non-coking material to generate a process stream comprising aromatic compounds. The process stream is passed to a fractionation unit to separate light gas components comprising C4 and lighter hydrocarbons, as well hydrogen and other light gases from the process stream. The fractionation unit generates an overhead stream having the light gas components and a bottoms stream having C5 and heavier hydrocarbons. The bottoms stream is passed to an aromatics extraction unit to create a purified aromatics stream and a raffinate stream having a reduced aromatics content.

The reforming process contacts the hydrocarbon feedstream with a catalyst and performs dehydrogenation and cyclization of hydrocarbons. The process conditions include a temperature greater than 540 C, and a space velocity between $0.6\ hr^{-1}$ and $10\ hr^{-1}$. Preferably the space velocity is between $0.6\ hr^{-1}$ and $8\ hr^{-1}$, and more preferably, the space velocity is between $0.6\ hr^{-1}$ and $5\ hr^{-1}$.

The process of the present invention allows for greater heating through altering the reactor surfaces, and the equipment that delivers the heated hydrocarbon feedstream to the reactors. This includes the transfer equipment, such as piping between the fired heaters and the reactor, as well as the internal walls to the surfaces in the fired heaters exposed to the feedstream. The internal surfaces can be sulfide, or coated with non-coking materials, or using a non-coking metallurgy.

In one embodiment, the process for the generation of aromatics from a hydrocarbon feedstream includes heating the hydrocarbon feedstream to a first temperature. The heated hydrocarbon feedstream is passed to a first reformer, which is operated at a first set of reaction conditions, to generate a first reformer effluent stream. The first reformer effluent stream is heated to a second temperature, and the heated first reformer effluent stream is passed to a second reformer. The second reformer is operated at a second set of reaction conditions and generate a second reformer effluent stream. The second reformer effluent stream is passed through a heat exchanger to preheat the feedstream.

The first temperature is a temperature between 500° C. and 540° C., and the second temperature is greater than 540° C. Each reformer can include a plurality of reactors with inter-reactor heaters, wherein each inter-reactor heater heats the stream to a desired temperature, and wherein. For the first reformer, each inter-reactor heater will heat the process streams to the second temperature before passing to the second reformer. With more than two reformers, all reformers except the last one will have the entering process stream heated to the first temperature and the inlet process stream to the last reformer will be heated to the second temperature.

The process can include a tail heater. The tail heater is used to heat the second reformer effluent to a third temperature. The heated second reformer effluent is then passed to a tail reactor. The third temperature is also greater than the first temperature, and preferably is greater than 540 C.

The reforming process is a common process in the refining of petroleum, and is usually used for increasing the amount of gasoline. The reforming process comprises mixing a stream of hydrogen and a hydrocarbon mixture and contacting the resulting stream with a reforming catalyst. The usual feedstock is a naphtha feedstock and generally has an initial boiling point of about 80° C. and an end boiling point of about 205° C. The reforming reactors are operated with a feed inlet temperature between 450° C. and 540° C. The reforming reaction converts paraffins and naphthenes through dehydrogenation and cyclization to aromatics. The dehydrogenation of paraffins can yield olefins, and the dehydrocyclization of paraffins and olefins can yield aromatics.

The reforming process is an endothermic process, and to maintain the reaction, the reformer is a catalytic reactor that can comprise a plurality of reactor beds with interbed heaters. The reactor beds are sized with the interbed heaters to maintain the temperature of the reaction in the reactors. A relatively large reactor bed will experience a significant temperature drop, and can have adverse consequences on the reactions. The catalyst can also pass through inter-reformer heaters to bring the catalyst up to the desired reformer inlet temperatures. The interbed heaters reheat the catalyst and the process stream as the catalyst and process stream flow from one reactor bed to a sequential reactor bed within the reformer. The most common type of interbed heater is a fired heater that heats the fluid and catalyst flowing in tubes. Other heat exchangers can be used.

Reforming catalysts generally comprise a metal on a support. The support can include a porous material, such as an inorganic oxide or a molecular sieve, and a binder with a weight ratio from 1:99 to 99:1. The weight ratio is preferably from about 1:9 to about 9:1. Inorganic oxides used for support include, but are not limited to, alumina, magnesia, titania, zirconia, chromia, zinc oxide, thoria, boria, ceramic, porcelain, bauxite, silica, silica-alumina, silicon carbide, clays, crystalline zeolitic aluminasilicates, and mixtures thereof. Porous materials and binders are known in the art and are not presented in detail here. The metals preferably are one or more Group VIII noble metals, and include platinum, iridium, rhodium, and palladium. Typically, the catalyst contains an amount of the metal from about 0.01% to about 2% by weight, based on the total weight of the catalyst. The catalyst can also include a promoter element from Group IIIA or Group IVA. These metals include gallium, germanium, indium, tin, thallium and lead.

The data, as presented in examples 1-12, shows a significant increase in aromatics, hydrogen and C5+ liquid product when the same catalyst is operated at a higher temperature, but the same catalyst is operated at different space velocities. This increase is expected at the higher temperature due to a decrease in activity through a reduced chloride content on the catalyst.

The increases due to higher temperatures allow for increased throughputs, or increased federates, and produces more aromatic products at a lower cost.

TABLE

Results of variable temperature inputs

| No. | Case | RONC | C5+ (wt %) | Total A (wt %) |
|---|---|---|---|---|
| 1 | Base case: 4RX R-264HY (Tin = 1010 F.) Cat. distrib.: 13.3%, 20%, 33.3%, 33.3% | 105 | 82.9 | 65.8 |
| 2 | $1^{st}$ RX Tin = 1040 F., 2-4 RX Tin = 1010 F., cat. distrib.: 13.3%, 20%, 33.3%, 33.3% | 105.2 | 82.8 | 66.5 |
| 7 | 1-3 RX Tin = 1040 F.; $4^{th}$ RX Tin = 1010 F., cat. distrib.: 13.3%, 20%, 33.3%, 33.3% | 105.8 | 82.4 | 69.1 |
| 8 | $1^{st}$ RX Tin = 980 F. (wt. T profile); 2-4 RX Tin = 1010 F., cat. dist. 13.3%, 20%, 33.3%, 33.3% | 106.3 | 81.5 | 71.3 |
| 9 | $1^{st}$ RX Tin = 980 (wt. T profile); 2-4 RX Tin = 1010 F.; cat. dist. 13.3%, 20%, 33.3%, 33.3% | 106.4 | 81.0 | 71.8 |
| 10 | $1^{st}$ RX Tin = 980 (wt. T profile); 2-4 RX Tin = 1040 F.; cat. dist. 33.3%, 13.3%, 20%, 33.3% | 106.7 | 79.7 | 72.7 |
| 11 | $1^{st}$ RX Tin = 1010 (wt. T profile); 2-4 RX Tin = 1040 F.; cat. dist. 13.3%, 20%, 33.3%, 33.3% | 106.7 | 79.6 | 73.1 |
| 12 | $1^{st}$ RX Tin = 1010 (wt. T profile); 2-4 RX Tin = 1040 F.; cat. dist. 33.3%, 13.3%, 20%, 33.3% | 106.7 | 79.2 | 73.2 |

Table of results for different cases for maximum aromatics. An imposed inlet T for the reactors was set, the pressure was 50 psig, the inlet H2/HC ratio was set at 2.0. There was no particular octane target, and no LHSV target.

Numerous experiments were performed to study the effects of varying the inlet temperatures for a four reactor reformer system, and some of the results are presented in the Table.

High Temperature Catalytic Reforming Process Pilot Plant Information:

Recent pilot plant 1002 data (R1061) showed an ~1.0 wt % aromatics yield benefit of low density (0.31 g/cc) catalyst compared to R-134 reference catalyst. An aromatics yield increase of 1% is worth ~$10MM/year for a 45,000 BPSD Platforming unit producing BTX feedstock for an Aromatics complex. The low density catalyst operated between 530-540° C. and about 15-18° C. higher than the R-134 reference and it is hypothesized the higher yields are in part due to the higher temperatures.

This temperature range is above the typical operating range for CCR Platforming Units of 525-540° C. (977° F. to 1004° F.) as listed in page 4.16 of the Handbook of Petroleum Refining Processes, $2^{nd}$ Edition by R. Meyers.

Also, operating data from ATC has also shown a yield benefit when operating with an ascending reactor temp profile (lowest to highest across reactors 1 to 4). It is thought that higher temperatures at the last reactors may provide the largest yield benefits.

One potential option is to claim a specific reactor inlet temperature range above the typical ranges published in literature. Another option is to claim specific process designs that enable operation at increased temperatures and/or specific temperature profiles.

The invention has additional aspects that can be applied to existing units. The existing units can be revamped to improve the yields. Optional revamp improvements include the following.

(1) Utilize reactor/heater bypasses to shift heat duty from the large upstream heaters to the smaller downstream heaters in order to operate at higher inlet temperature downstream, as shown in FIG. 1. The upstream heaters include the charge heater 10 and the No. 1 interheater 20. The system shown in FIG. 1 includes four reactors with interheaters and reactor/heater bypasses. The system includes the flow from a combined feed exchanger 12 to the charge heater 10. The heated feed 14 can pass to a first reactor 30, and some of the feed can be directed to a second reactor 40 through a bypass device 16. The first reactor effluent 32 is passed to the first interheater 20 to generate a heated second reactor feed 22. A second bypass device 24 can direct some of the second reactor feed 22 to a third reactor 50. The second reactor effluent 42 is passed to a second interheater 60 to generate a heated third reactor feed 62. A third bypass device 64 can direct some of the third reactor feed 62 to a fourth reactor 70. The third reactor effluent 52 is passed to a third interheater 80 to generate the fourth reactor feed 82. The fourth reactor effluent 72 is passed to a heat exchanger to preheat the feed.

Figure 2:
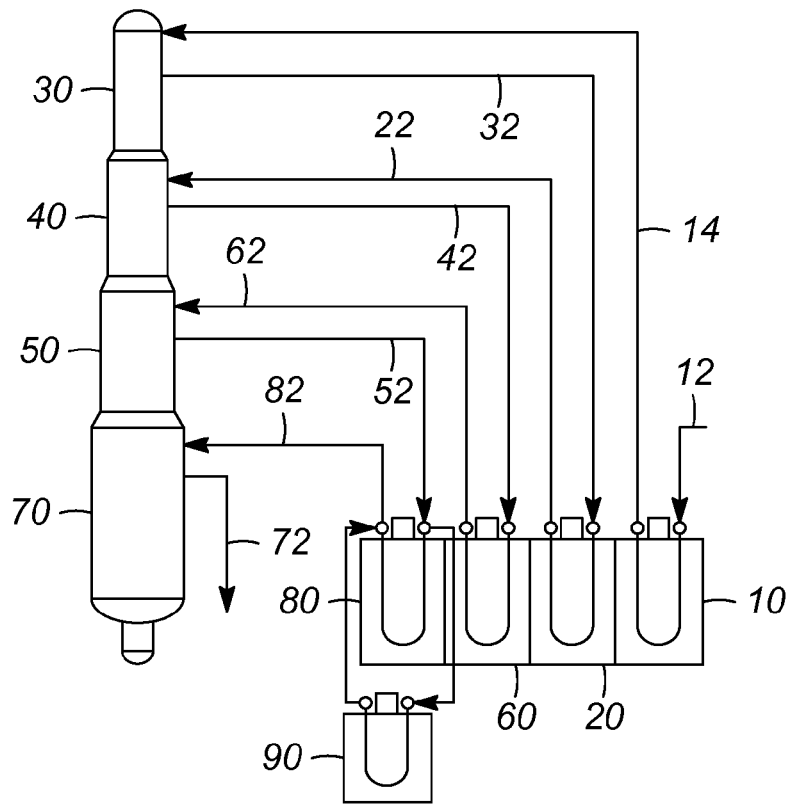
FIG. 2 shows a four reactor system with controls for enabling higher fourth reactor inlet temperatures, including an auxiliary helper heater for enabling higher reactor 4 inlet temperatures.

(2) Install an auxiliary heater in a parallel configuration with the existing last inter heater. This allows for increased inlet temperatures to the last reactor, as shown in FIG. 2. The process and device in FIG. 2 is as shown in FIG. 1, but with the addition of an auxiliary heater 90. A portion of the third reactor effluent 52 can be passed through the auxiliary heater 90 and the heated portion can be fed back to the fourth reactor feed 82. In an alternative, the auxiliary heater can heat the effluent stream 82 from the third interheater 80, before passing the effluent stream 82 to the fourth reactor 70.

(3) Install a new high temperature tail reactor closely coupled to a new last interheater. This will minimize the hot residence time. Catalyst flow to the new tail could be in series or in parallel with the existing CCR as shown in FIG. 3. The process and device in FIG. 3 is as shown in FIG. 1, but with the addition of a tail heater 100 and a tail reactor 110. The effluent stream 72 from the fourth reactor 70 is passed to the tail heater 100, and the heated effluent stream 102 is passed to a tail reactor 110 to boost the aromatic formation.

(4) The existing last interheater can be upgraded with new tubes, or retubing, using upgraded metallurgy to enable higher temperatures to the existing last reactor or to a new tail reactor. With a new tail reactor, the outlet of the existing reactor 3 can be routed to the inlet of existing reactor 4. The reactor 4 outlet would then go to the existing re-tubed interheater 3 and then to the new tail reactor.

New process improvements can optionally include the following.

(1) The units can be designed to operate with an ascending reactor temperature profiles, instead of the currently designed flat temperature profiles.

(2) The small temperature tail reactor can be designed in close coupling with a small interheater operated at high temperatures. The catalyst flow can be in series or in parallel operation with the upstream reactors.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. An apparatus for reforming a hydrocarbon process stream comprising:
   a vessel having a non-coking surface, with an inlet for the hydrocarbon process stream, an outlet for an effluent stream, an inlet for a catalyst feedstream, and an outlet for a catalyst effluent stream, wherein the vessel comprises:
   a plurality of reactor beds, having a radial flow reactor design, comprising:
   a plurality of modified scallops arrayed circumferentially around the inside wall of the vessel;
   a central perforated pipe;
   a reactor bed of catalyst disposed between the central pipe and the plurality of scallops;
   a heat exchanger, having an inlet for admitting the hydrocarbon process stream and an outlet in fluid communication with the vessel hydrocarbon inlet;
   a conduit connecting the heat exchange outlet with the vessel inlet, wherein the conduit has a coating on the internal surface;
   a plurality of reactor beds disposed within the vessel, wherein each reactor bed has a catalyst inlet and a catalyst outlet, and a process stream inlet and a process stream outlet;
   interbed heaters, wherein each heater has in inlet in fluid communication with a reactor bed process stream outlet, and an outlet in fluid communication with a reactor bed process stream inlet; and
   at least one auxiliary heater having an inlet in fluid communication with one reactor bed process stream outlet, and an outlet in fluid communication with a second reactor bed process stream inlet;
   wherein the reactor beds are sized to limit the temperature drop to less than 10° C.

2. The apparatus of claim 1 wherein the coating of the internal surfaces includes a sulfide coating.

3. The apparatus of claim 1 wherein the coating of the internal surfaces includes a non-metallic coating.

4. The apparatus of claim 3 wherein the non-coking coating comprises a metal oxide selected from the group consisting of aluminas, silicas, ceramics, metal oxides, metal sulfides, glasses, and mixtures thereof.

5. The apparatus of claim 1 wherein the auxiliary heaters are sized to return the outlet process streams to a temperature within 5 C of the inlet temperature of the first reactor bed.

* * * * *